United States Patent [19]

Skelton et al.

[11] 4,241,118

[45] Dec. 23, 1980

[54] TENNIS BALLS AND METHOD OF MANUFACTURE

[75] Inventors: John Skelton, Sharon; Meredith M. Schoppee, Norfolk; Daniel K. Schiffer, Framingham, all of Mass.; Roy B. Parker, Monmouth, Me.

[73] Assignee: Albany International Corp., Albany, N.Y.

[21] Appl. No.: 2,207

[22] Filed: Jan. 9, 1979

Related U.S. Application Data

[63] Continuation-in-part of Ser. No. 914,256, Jun. 9, 1978, abandoned, which is a continuation-in-part of Ser. No. 819,254, Jul. 27, 1977, abandoned.

[51] Int. Cl.³ .................. A63B 37/12; A63B 29/08
[52] U.S. Cl. ..................... 428/35; 156/213; 156/306.6; 156/324.4; 273/61 R; 428/90; 428/913
[58] Field of Search .................. 428/35, 90, 913; 156/213, 306; 273/29 R, 61 R–61 B

[56] References Cited

U.S. PATENT DOCUMENTS

| | | | |
|---|---|---|---|
| 3,074,144 | 1/1963 | Reed | 428/95 |
| 4,154,635 | 5/1979 | McGlashen | 156/213 |

*Primary Examiner*—Marion McCamish
*Attorney, Agent, or Firm*—Kane, Dalsimer, Kane, Sullivan and Kurucz

[57] ABSTRACT

The disclosure is of a method of adhering a textile tennis ball cover to a tennis ball core. The method comprises providing a core and a textile tennis ball cover for the core. A hot-melt adhesive is also provided, disposed in association with the cover material. The cover and adhesive are assembled on the core and the hot-melt adhesive caused to melt and form a bond between core and covering material. Upon solidifying, the adhesive adheres the cover to the core of the tennis ball with a high degree of tenacity. The method of the invention is advantageous over the prior art commercial methods, in terms of efficiency and economics.

13 Claims, 3 Drawing Figures

TENNIS BALLS AND METHOD OF MANUFACTURE

CROSS-REFERENCE TO RELATED APPLICATIONS

This application is a continuation-in-part of copending U.S. Application Ser. No. 914,256 filed June 9, 1978, now abandoned, which was a continuation-in-part of U.S. Application Ser. No. 819,254 filed July 27, 1977, and now abandoned.

BACKGROUND OF THE INVENTION

1. Field of the Invention

The invention relates to methods of adhering textile covers to spherical objects and more particularly relates to methods of covering tennis balls with textile fabrics.

2. Brief Description of the Prior Art

A commercially practiced prior art method for covering tennis balls is depicted schematically in FIG. 1 of the attached drawings. In the conventional process (shown in the figure), the cover fabric is coated with one component of a two-part latex adhesive, and the core is coated with the second component. An array of identical dumbbell-shaped pieces is cut from the adhesive-coated fabric and the remaining fabric is removed as waste. The dumbbell-shaped pieces are stacked in register and the stack is clamped and dipped in a latex bath so that the edges of the individual pieces are coated. After separation of this stack of pieces the adhesive-coated core and two of the adhesive-backed and seam-coated dumbbells are assembled to form a complete ball. The assembled balls are cured in heated molds for approximately 10 minutes, during which time the adhesive bond between the cover and the core is developed, and the seam is thereby formed. The process involves three distinct coating and drying steps, an elaborate and time-consuming assembly and disassembly routine for the stack of pieces, and a slow cure cycle for the assembled ball. The waste fabric from the cutting process is contaminated with adhesive, which is difficult and expensive to remove, and hence the potential for recycling the waste is small.

The method of the present invention simplifies the prior art process of covering tennis balls, reducing the number of steps required and eliminating the need for solvent based adhesives. Solvents must be driven off into the atmosphere in a separate step. Release of solvents into the atmosphere is of course an undesirable occurrence. In addition, in the preferred method of the invention, the waste fabric from the above-described cutting process is not contaminated with adhesive. The waste cuttings therefore can be economically recycled.

Representative of prior art teachings in the written literature are those found in U.S. Pat. Nos. 2,652,094; 3,558,413; and 3,684,284; see also British patent specification No. 1,152,240.

SUMMARY OF THE INVENTION

The invention comprises a method of adhering a textile tennis ball cover to a tennis ball core, which comprises;

providing a tennis ball core;

providing a textile tennis ball cover of a cut, dimension and configuration to cover said core;

providing a hot-melt adhesive in a solid form;

assembling said cover on said core with said adhesive in association with said cover and in contact with the core;

causing said adhesive to melt and form a bond between said core and said cover; and allowing said melt to solidify, whereby said cover is adhered to said core.

The invention also comprises tennis balls prepared by a method of the invention.

The term "core" as used herein is synonymous with the trade used term "pinky".

DETAILED DESCRIPTION OF THE PREFERRED EMBODIMENTS OF THE INVENTION

Figure 1:
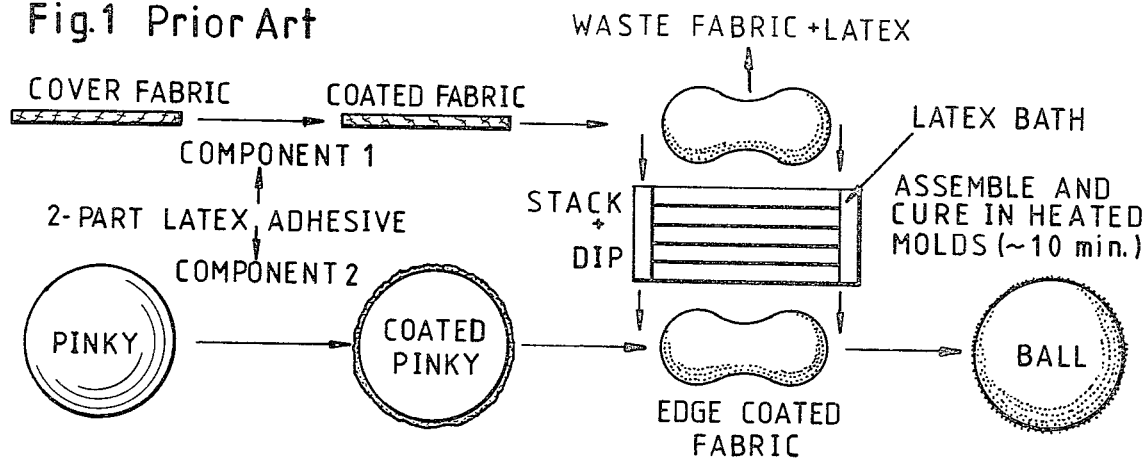
FIG. 1 is a schematic representation of a prior art process for adhering a cover to the core of a tennis ball.
Figure 2:
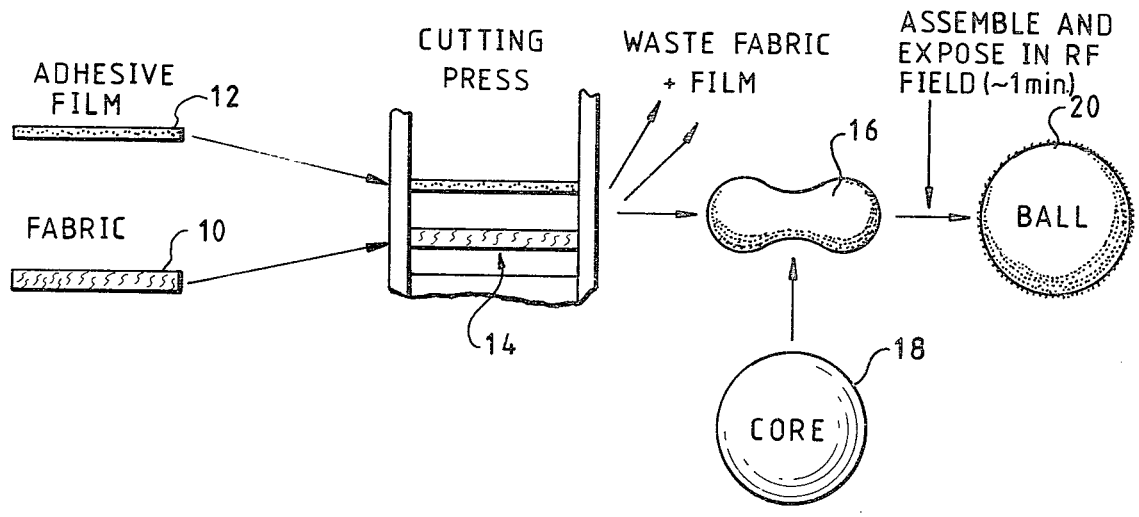
FIG. 2 is a schematic representation of a preferred embodiment process of the invention.
Figure 3:
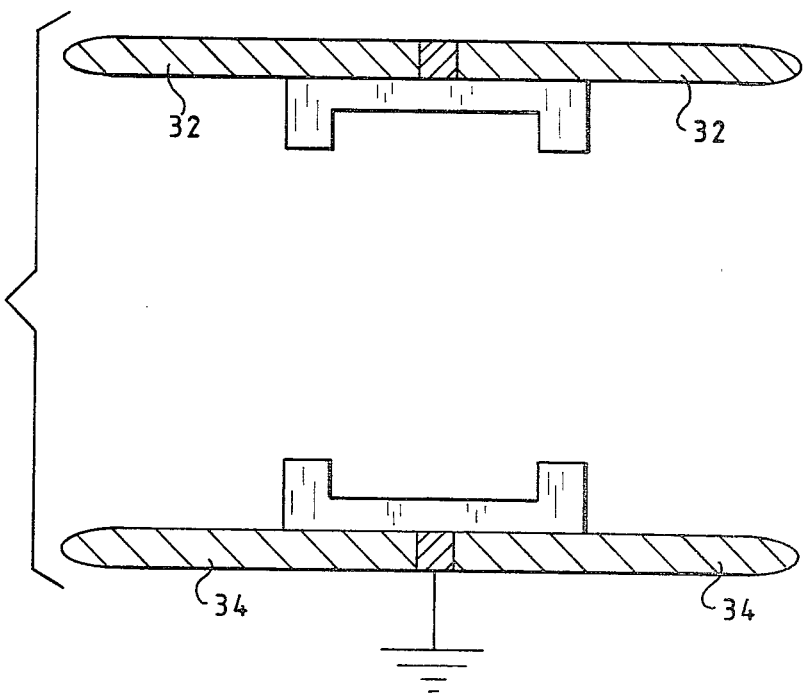
FIG. 3 is a cross-sectional side elevation of a suitable R-F electrode configuration employed in the method of the invention.

A complete understanding of the process of the invention may be obtained by a reading of the following description in conjunction with the drawings of FIGS. 2 and 3.

Referring to FIG. 2, a schematic representation of a preferred embodiment process of the invention, one can follow the process as follows. A sheet of a covering fabric 10 and a solid film of a hot-melt adhesive are fed separately to a cutting press 14. In cutting press 14, film 12 and fabric 10 are laminated together within the outline of the cutting die, by application of a heated shoe. The cutting die 14 cuts the laminate in a size and configuration (such as a dumbbell shape) appropriate for covering a tennis ball core. In this manner the hot-melt adhesive film 12 is brought into intimate association with covering fabric 10.

From the press 14 emerge dumbbell-shaped pieces 16 of fabric with the solid hot-melt adhesive attached to them in perfect register, and separate and distinct sheets of waste fabric and waste adhesive film. Since the fabric waste is not contaminated by adhesive, the potential for economic recycling of the separate waste fabric and the separate waste hot-melt adhesive film is great.

In the next step of the preferred process of the invention, the piece 16 is assembled with the core 18 (pinky) of a tennis ball. The assembly of the final tennis ball may be carried out without the use of a separate adhesive applied directly to the pinky (as is required in the conventional prior art process). The assembly can often be carried out more easily if the dumbbell-shaped fabric-/adhesive pieces 16 are preformed so that they conform more closely to the shape of the core. The preforming can be done by assembling the pieces around an inert core in a mold and heating them briefly to allow the adhesive film 12 to soften and deform. After cooling, the pieces 16 are removed from the mold and reassembled on a rubber core 18. While the best fit with the core is achieved if the premolding is done on a spherical form, an adequate level of fit can also be achieved if the pieces 16 are preshaped around a cylindrical form. This modification has the advantage that it can be carried out continuously by feeding the combination pieces 16 around a heated cylindrical roller. The laminate pieces 16 are assembled on core 18 with the film 12 side facing the core 18.

The tennis ball seam between interlocking pieces 16 may be formed using hot-melt adhesive of the same type employed in film 12. The seaming material may be extruded as a filament and separately applied, or it can also be applied to the outer edge of the dumbbell-shaped pieces 16 at the same time as the cutting is done using injection molding techniques. The use of the same material for the seam and for bonding improves the overall efficiency of the process of the invention since it offers an additional route for recycling material. If the seam material is preassociated with the pieces 16, it is of course assembled with the core 18 simultaneously with assembly of the pieces 16 and with core 18. If the seam adhesive is used in the form of a separately applied extruded strip, it has been found that an extruded monofilament with a triangular cross-section offers advantages over a circular cross-section since this configuration gives good penetration of the seam material between the abutting pieces 16 of cover fabric, and at the same time give the external surface of the seam material the necessary width. Other cross-sectional shapes, such as a T-section would also achieve the same result.

Figure 4:
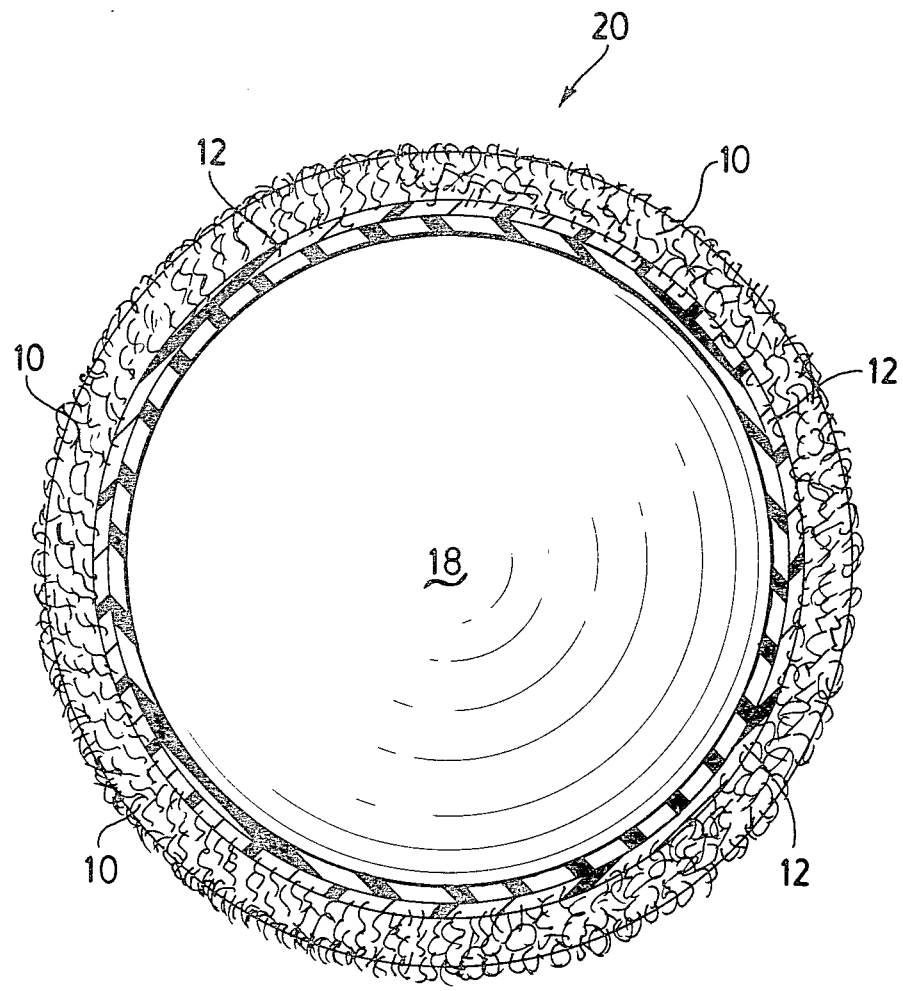

Following the assembly of the tennis ball coverings 16 on the tennis ball core 18, the assembled unit may be placed in an appropriate jig or mold to hold the coverings in position. One then causes the adhesive film 12 to melt and form a bond between the fabric 14 and core 18. Upon allowing the melt to cool, it resolidifies, tenaciously adhering the fabric covering 14 to the core 18, thus providing a covered tennis ball 20 as shown in FIG. 4, a cross-sectional side elevation.

Melting of the hot-melt adhesive film 12 may be caused or accomplished with the direct application of heat, radio-frequency radiation (R-F), microwave radiation or like techniques.

The heating of the mold and ball assembly can be carried out using direct application of heat, but a dramatic decrease in processing time can be achieved if some form of dielectric heating, such as R-F or microwave, is used. With R-F heating the heating time can be reduced to less than one minute, compared to 10 minutes that is more typical of direct heating. This is attractive not only for the opportunity that it offers for increasing production rates, but also for the potential savings in energy than can be realized. The R-F technique reduces to approximately 1/10, the order of magnitude of the time taken for the critical bonding step and accordingly is a preferred embodiment step in the process of the invention as shown in FIG. 2. This reduction of time during which the tennis ball and/or its component parts is exposed to high temperatures (circa 300°–350° F.) is also advantageous in that it provides a tennis ball product of improved mechanical or physical properties in comparison to balls exposed to such heat for even as little as 10 to 15 minutes. Thus, by the preferred method of the invention, one may obtain a tennis ball in which the adhesion between the core and the cover is achieved without substantial modification of the mechanical properties of the core or cover material caused by prolonged exposure to elevated temperatures. By the term "without substantial modification" we mean that following assembly of the core and coverings thereon, the change in the initial tensile modulus of the core material can be specified as being less than 2½%; in the tensile strength of the core material as less than 5%; in the effective compressive modulus of the complete cores as less than 2½%; in the energy of rebound of the rubber cores (dropped from a height of 100 inches) as less than 2%; and in the torsional modulus of rewet wool fiber from the cover of less than 5%. Overall, no relevant mechanical property changes by more than 5% during assembly of the coverings on the ball core. Those skilled in the art of tennis ball manufacture will appreciate the advantage of the superior balls which may be made by the preferred method of the invention.

If the adhesives are melted using R-F or microwave radiation, it is necessary that the supporting molds be relatively transparent to radiation in the applied frequency ranges. In this way the energy absorbed mainly in the workpiece and the process efficiency is improved. Polytetrafluoroethylene is ideal for use as a mold material since it combines low dielectric loss, good mechanical workability and excellent release behavior. It has been used very successfully both as a spherical cavity mold and as an inert core for the preshaping of the fabric pieces.

Proper design of the electrodes is a factor in the preferred use of R-F radiation in the method of the invention. If an assembled ball is placed in an R-F field generated by two flat parallel opposed electrodes (perhaps the simplest possible electrode configuration), the heating effect is concentrated in an equatorial zone, since this zone has the greatest area of core and adhesive in a direction parallel to the electric field. It is very difficult to produce a uniform distribution of energy absorption throughout the entire volume of material in a hollow dielectric sphere, but the depth of the equatorial zone of high absorption can be increased by appropriate electrode design. If the width of the dumbbell-shaped pieces 16 can be made equal to or greater than the width of the core 18, then the long axes of the two interlocking pieces 16 that make up the ball cover can be aligned in turn with the equatorial plane, and the cover can be completely bonded to the core 18 in two passes through the R-F field. The desired uniformity of heating can be achieved by rotating the ball through 90° about an axis perpendicular to the field lines during the interval between passes; by actuating in turn each of two pairs of electrodes oriented so that their field lines are perpendicular; by continuous rotation of the mold assembly; or by the provision of a rotating electric field. A simple electrode design that produces an increase in depth of the heated equatorial zone is shown in FIG. 3, a cross-sectional side elevation. As shown in FIG. 3, an upper electrode 32 is spaced above electrode 34 to permit the ball to be placed therebetween.

The utilization of the heating energy can be optimized by also making the dumbbell-shaped piece 16 of uniform width. In this case the "dumbbell" shape degenerates into a rectangle with semi-circular ends, but this shape, which has been used to make completely satisfactory balls, has the additional advantage that the efficiency of die cutting the dumbbells is very high, since the packing of pieces 16 can be more dense if the edge boundaries are straight.

The fabric 10 employed for the dumbbell-shaped pieces 16 may be any fabric conventionally employed as a tennis ball covering material. Such fabrics are well known to those skilled in the art.

The heat activated adhesive employed in the form of film 12 may be any known hot-melt adhesive, preferably having a melting point within the range of from about 65° to about 200° C. Representative of such hot-melt adhesives are hot-melt adhesives which compositionally are:
polyepoxides
polyolefins
polyesters
polyamides
polyurethanes
ethylene vinyl acetate polymers
polyvinyl chlorides
polyvinyl butyrals
vinyl chloride-acetate polymers
nitrile phenolic polymers
acrylic acid-based polymers
styrene-butadiene copolymers
cellulose-derived polymers, blends thereof and the like.

If dielectric heating is used to melt the adhesive, the adhesive should also have the appropriate electrical properties.

The following examples describe the manner and process of making and using the invention and set forth the best mode contemplated by the inventor of carrying out the invention but are not to be construed as limiting. Bond strength was determined by peeling the fabric pieces from the ball using an Instron tensile tester with the ball held in a gimtal mount so it is free to rotate.

EXAMPLE 1

A pair of "dumbbell" cut coverings for a tennis ball and a rubber core were provided. A sheet of polyamide hot-melt adhesive having a thickness of about 2 mils. is cut to match the configuration and dimensions of the covering pieces. The parts are assembled by first tacking the polyamide sheet to one surface of each of the "dumbbell" shaped coverings. The assembled unit is then assembled with the rubber core and the assembled unit placed in an appropriate jig where it is exposed to R-F radiation for 20 seconds. Upon removal from the jig, it is found that the ball coverings were adhered to the core with a bond strength of circa 15 lbs. per inch. It is apparent that during R-F radiation the hot-melt polyamide adhesive sheet melted and then resolidified upon cooling to form the bond structure.

EXAMPLE 2

A conventional tennis felt covering fabric is provided in sheet form. The sheet of fabric is overlaid with a film of polyester hot-melt adhesive. (Hytrel 4056 film adhesive, 5 mils thick). The sheet and film were passed through a cutting press and die cut in the shape and dimensions of dumbbells for covering a tennis ball, with simultaneous lamination of the film of hot-melt adhesive to the fabric. The laminate dumbbells are assembled with a natural rubber pinky (core).

The assembled coverings and core are placed in a Teflon mold formed from a split 3" cube. Each half of the mold has a 2.5" diameter hemispherical cavity machined from it, and also has machined cut-outs to accommodate the electrode shape. The assembled ball components were then exposed to R-F energy, employing a Thermex ® T36b324X R-F generator, operating at approximately 27 MHz, (supplied by Votator Division of Chemetron Corp., Louisville, Kentucky). The electrode configuration was as shown in FIG. 3; a series inductance of approximately 5 $\mu$H was located just before the high voltage electrode.

The R-F oscillator was tuned to give a grid current of 200 milliamps and a plate current of 0.50-0.75 amps. The ball was formed by making two exposures each of 30 seconds duration to the R-F field. The ball was cooled and rotated through 90° between passes, so that each dumbbell-shaped piece was exposed in turn in the highly heated equatorial zone. The seam monofilament (Hytrel 5056 extruded monofilament) was added after the first pass.

The ball formed by this means was of excellent appearance and performance. When dropped from a height of 100 inches it rebounded 53 inches in accordance with specification. The ball showed a bond strength between cover and core of 15-40 lbs/inch.

EXAMPLE 3

Similarly, repeating the procedure of Example 2, supra., but employing microwave radiation (Tappan 56-2343 microwave oven operating at a frequency of 2450 MHz) instead of R-F radiation, a similar tennis ball is obtained.

EXAMPLE 4

Similarly, repeating the above procedure of Example 2, supra., but exposing the assembled core and covering to heat of 150° C. for 35 minutes in a conventional hot air oven instead of applying R-F radiation, the coverings are adhered to the pinky, employing as the film of adhesive (Plastilok 800) instead of Hytrel 4056.

EXAMPLE 5

A conventional tennis felt covering fabric is provided in sheet form and the sheet of fabric is overlaid with a film of hot-melt adhesive (Hytrel 4056 film adhesive, 5 mils thick). The sheet and film are passed through a cutting press and die cut in the shape and dimensions of dumbbells for covering a tennis ball, with simultaneous lamination of the film of hot-melt adhesive to the fabric. The laminated dumbbells are assembled with a natural rubber pinky (core) in a Teflon mold formed from a split 3" cube. Each half of the mold has a 2.5" diameter hemispherical cavity machines from it, and also has machined cutouts to accommodate the electrode shape. The assembled ball components are then exposed to R-F energy, employing a Thermex ® T36B324X R-F generator, operating at approximately 27 MHz, (supplied by Votator Division of Chemetron Corp., Louisville, Ky).

The ball is formed by making two exposures, each of 30 seconds duration to the R-F field. The ball is cooled and rotated through 90° between passes, so that each dumbbell-shaped piece is exposed in turn in the highly heated equatorial zone. The seam monofilament (Hytrel 5056 extruded monofilament) is added after the first pass.

The ball formed by this means is of excellent appearance and performance. When dropped from a height of 100 inches it rebounds 53 inches in accordance with specification. The ball shows a bond strength between cover and core of 15-40 lbs/inch.

For an exposure time of 60 seconds, the maximum temperature at the interface between cover and core just exceeds the melting temperature of the Hytrel and thus a ball is produced with a total time exposure which is approximately one tenth of the time required in conventional processing, with attendant minimization or elimination of potential thermal damage.

What is claimed is:
1. A method of adhering a textile tennis ball cover to a tennis ball core, which comprises;
providing a tennis ball core;

providing a textile tennis ball cover of a cut, dimension and configuration to cover said core;

providing a hot melt adhesive in a solid form;

assembling said cover on said core with said adhesive in association with said cover and in contact with the core;

applying radiation selected from radio-frequency and microwave radiations to the assembled core, cover and adhesive for a period of time to cause said adhesive to melt and form a bond between said core and said cover without substantial modification to the mechanical properties of the core and cover material; and allowing said melt to solidify, whereby said cover is adhered to said core.

2. The method of claim 1 wherein the solid form is a film.

3. The method of claim 2 wherein assembly comprises laminating the film to the cover and placing the laminate on the core.

4. A process for manufacturing a tennis ball, which comprises;

providing a sheet of tennis ball cover fabric;

providing a solid sheet of a hot-melt adhesive;

laying up together the sheet of cover fabric and the solid sheet of hot-melt adhesive;

providing means for cutting from the laid up sheets, blanks of a size and configuration adapted to cover the core of a tennis ball;

laminating together within the outline of said blanks, the laid up sheets while leaving the laid up sheets unlaminated outside of the outline of said blanks;

cutting said blanks, whereby the sheets of adhesive and fabric outside of said outline remain free of each other and said blanks;

providing a tennis ball core;

assembling the cut blanks on the core to cover said core, with the solid sheet of hot-melt adhesive next to the core;

melting the sheet of hot-melt adhesive; and allowing the melted hot-melt adhesive to resolidify whereby the cover fabric is adhered to the core.

5. The process of claim 4 wherein said cutting and laminating are carried out simultaneously.

6. The process of claim 4 wherein laminating follows cutting.

7. The process of claim 4 wherein cutting follows laminating.

8. The process of claim 4 wherein melting is caused by application of radio-frequency radiation.

9. The process of claim 4 wherein melting is caused by application of microwave radiation.

10. The process of claim 4 wherein a monofilament of the adhesive is assembled with the peripheral edge of the laminate, to form the seam of the tennis ball.

11. A tennis ball, which comprises; a tennis ball core, a textile cover for the core and a hot-melt adhesive bonding the core to the cover, said bond being of the character achieved by heating the hot-melt adhesive by means of applied radiation selected from microwave and radio-frequency radiation for a period of time sufficient to melt the adhesive while in contact with the core and the cover and then allowing the melt to resolidify without substantial modification to the mechanical properties of the core and the cover material caused by prolonged exposure to elevated temperatures.

12. The tennis ball of claim 11 in which the hot-melt adhesive is chosen from among the following materials or blends containing these materials as components:

polyolefins
polyesters
polyamides
polyurethanes
ethylene vinyl acetate polymers
polyvinylidene chlorides
polyvinyl butyrals
vinyl chloride-acetate polymers
nitrile phenolic polymers
acrylic acid-based polymers
styrene-butadiene copolymers
cellulose-derived polymers.

13. The tennis ball of claim 11 wherein the textile cover includes wool fibers and in which the torsional modulus of the wool component of the cover material is substantially unchanged by development of the bond between core and cover.

* * * * *